Jan. 14, 1969 G. E. PETTS III 3,422,361

ELECTRIC PULSE DETECTING CIRCUIT

Filed Jan. 14, 1965

WITNESSES:

INVENTOR
George E. Petts, III

BY Ernest P. Klipfel
ATTORNEY

United States Patent Office 3,422,361
Patented Jan. 14, 1969

3,422,361

ELECTRIC PULSE DETECTING CIRCUIT

George E. Petts III, Annapolis, Md., assignor to Westinghouse Electric Corporation, Pittsburgh, Pa., a corporation of Pennsylvania Filed Jan. 14, 1965, Ser. No. 425,587
U.S. Cl. 328—119 4 Claims
Int. Cl. H03k *5/20;* H03k *1/00;* H03k *3/04*

ABSTRACT OF THE DISCLOSURE

An electric pulse detecting circuit utilizing a delay line having diodes connected therealong at spaced intervals. The diodes are normally forward biased. Reverse biasing input pulses are applied to one end of the delay line. An output pulse is produced for the duration of time that the input pulses reverse bias the diodes. The spacing of the diodes is made in accordance with the spaced sequence of input signals to be detected.

This invention relates to electric gating circuits and in particular to electric gating circuits using a pulse transmission means along which are spaced a plurality of unilateral conducting means.

An object of this invention is to provide a detecting circuit responsive to pulse sequences.

Another object of this invention is to provide a simple, reliable, pulse shrinking circuit.

A further object of this invention is to provide a gating circuit which yields jitter free service and has low power consumption.

Broadly, these and other objectives are obtained by providing a pulse delay device, such as a transmission line, along which is connected a pulse gate. The gate includes a plurality of diodes, or other unilateral conducting devices, connected by one terminal along the transmission line at predetermined points. To open the gate, a pulse must be present in the transmission line at every diode connection. The gate provides an output signal for the duration of this condition. A sequence of pulses so spaced as to simultaneously appear at each diode, will effect an output. The proper spacing of this pulse sequence is the essence of the decoding operation. Also, a single long pulse capable of encompassing all of the diode connections at once will effect an output. In this instance, the output is shorter than the long input pulse, and illustrates the pulse shrinking operation.

The novel features which are believed to be characteristic of the invention, both as to its organization and method of operation, together with further objects and advantages thereof will be better understood from the following detailed description considered in connection with the accompanying drawings in which several embodiments of the invention are illustrated by way of example. It is to be understood expressly, however, that the accompanying drawings are for the purpose of illustration and description only, and are not intended as a definition of the limits of the invention.

Figure 1:
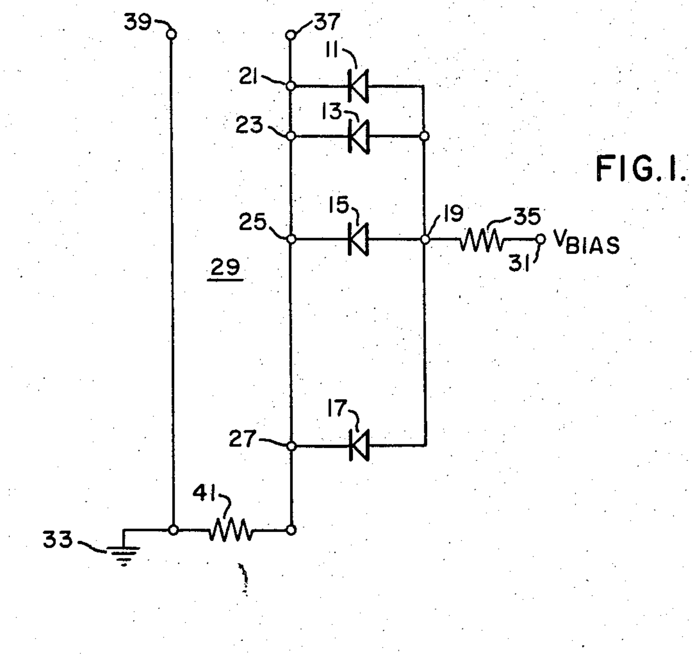

The accompanying drawings are:

FIG. 1 which shows a pulse sequence detector embodiment of the invention; and

Figure 2:
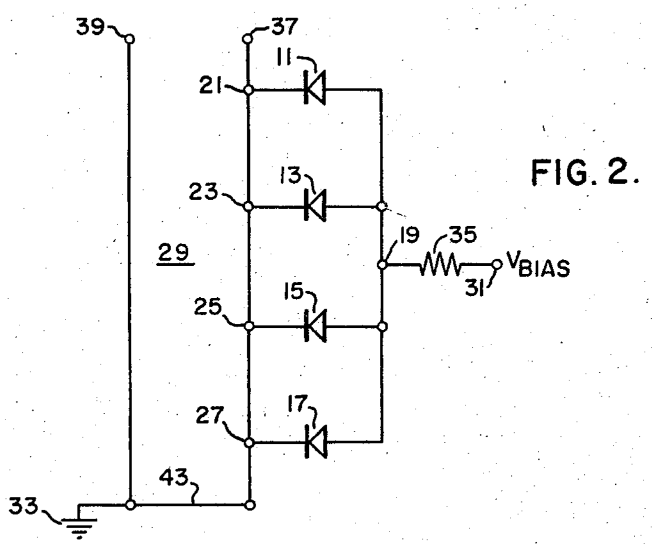

FIG. 2 which shows a pulse shrinking embodiment of the invention.

Referring now to FIG. 1 in which is shown the detector embodiment of the invention having diodes 11, 13, 15 and 17 connected in parallel between common point 19 and transmission line 29 at points 21, 23, 25 and 27, respectively. These diodes are normally in a low impedance forward biased state due to a voltage $V_{bias}$ applied across point 31 and ground 33. When no control pulses are present in transmission line 29, current passes from point 31 through resistance element 35, through common point 19, through the forward biased diodes, and through resistance element 41 to ground 33. The output is taken across common point or output terminal 19 and ground 33. Aside from the small $V_F$, which appears across the forward biased diodes this output is normally the relatively low voltage which appears across resistance element 41.

Control pulses are applied to transmission line 29 at terminals 37 and 39. These pulses are greater than $V_F$ and in a reverse biasing relationship with the diodes; and as the pulses appear at points 21, 23, 25 and 27 the corresponding diodes are reversed biased. No output appears at output terminal 19 until all of the diodes are reversed biased, at which time all of the forward biased low impedance diodes become reversed biased high impedance diodes and the current through resistance element 35 drops to zero. $V_{bias}$ appears across the output terminal 19 for the duration of this reversed biased condition. If the control pulse sequence is not spaced according to the diode spacing, an output signal will not be effected. Resistance element 41 is equal to the characteristic impedance of the transmission line and effectively absorbs the control pulses once they have passed the diode connections 21, 23, 25 and 27.

Any number of diodes may be used, and the spacing therebetween may readily be changed. A converse output to the one described above may be taken across resistance element 35.

Referring now to the pulse shrinking circuit shown in FIG. 2, which is the same as the FIG. 1 circuit except the diodes are uniformly spaced and the transmission line is terminated in short circuit 43 instead of the characteristic impedance of transmission line 29.

In this embodiment a single control pulse is applied across input terminals 37 and 39. This control pulse must also be greater than $V_F$ and be in reverse bias relationship to the diodes.

As the leading edge of the control pulse appears at points 21, 23, 25 and 27 the corresponding diodes are reversed biased. When the control pulse reaches point 27, all of the diodes are reversed and the voltage at output terminal 19 becomes $V_{bias}$. The low impedance forward biased diodes have become high impedance reverse biased diodes and have caused the current through resistance element 35 to drop to zero. The $V_{bias}$ output voltage remains at terminal 19 until the control pulse arrives at short circuit termination 43 of transmission line 29 and the return pulse reflected therefrom returns to point 27. This return pulse, being inverted, negates the effect of the original control pulse which is still forward biasing all of the diodes. The voltage at point 27 becomes zero and diode 17 is once again forward biased establishing a low impedance path between output terminal 19 and ground 33. The length of the output pulse is the pulse travel time between point 27 to termination 43 and back again. This pulse is necessarily shorter than the control pulse and may be adjusted by relocating diode 17 or short circuit termination 43.

It will be recognized that the objects of the invention have been achieved by providing diodes spaced along a transmission line in matching relationship to a sequence of coded input pulses. The coded sequence of pulses effects an output from the circuit, while other pulse sequences will not. The circuit can be adapted to shrink pulses by short circuiting the end of the transmission line. Further, all of the elements of the circuit are passive in nature, thereby eliminating jitter which is sometimes objectionable when active circuit elements such as vacuum tubes are employed. The passive elements also serve to lower the power consumption of the circuit.

While the invention has been shown in but one form, it will be obvious to those skilled in the art that it is not so limited, but is susceptible of various changes and modifications without departing from the spirit thereof.

I claim as my invention:

1. In an electric circuit, the combination comprising:
(a) a transmission line having a first and a second conductor which have inductance therealong and capacitance therebetween, said first conductor provided with signal output means at a plurality of points therealong;
(b) a plurality of unilateral conducting means, each having a first and a second terminal, each connected by said first terminal to said first conductor at a respective one of said plurality of points; means for connecting all of said second terminals to a voltage source in forward bias relationship to said plurality; and
(c) signal input means located at one end of said transmission line for receiving input signals greater in magnitude than said voltage source and in reverse bias relationship to said plurality of unilateral conducting means; said input signals being spaced in a sequence according to the spacing between said points.

2. In an electric circuit, the combination comprising:
(a) a transmission line having a first and a second conductor which have inductance therealong and capacitance therebetween, said first conductor provided with signal output means at a plurality of points therealong;
(b) a plurality of diodes, each having a first and a second terminal, each connected by said first terminal to said first conductor at a respective one of said plurality of points; means for connecting all of said second terminals to a common voltage source in forward bias relationship to said plurality; and
(c) signal input means located at one end of said transmission line for receiving input signals greater in magnitude than said voltage source and in reverse bias relationship to said diodes; said input signals being spaced in a sequence according to the spacing between said points.

3. In an electric circuit for detecting pulse sequences, the combination comprising:
(a) a transmission line having a first and a second conductor which have inductance therealong and capacitance therebetween, said first conductor provided with signal output means at a plurality of points therealong;
(b) a plurality of diodes, each having a first and a second terminal, each connected by said first terminal to said first conductor at a respective one of said plurality of points; means for connecting all of said second terminals to a bias voltage source in forward bias relationship to said plurality by means of a common point;
(c) signal input means located at one end of said transmission line for receiving input signals greater in magnitude than said voltage source and in reverse bias relationship to said diodes; said input signals being spaced in a sequence according to the spacing between said points;
(d) signal absorption means located at the other end of said transmission line; and
(e) resistance means having a first and a second end, said first end connected to said common point, and said second end adapted to receive said bias voltage.

4. In an electric circuit for shrinking electric pulses, the combination comprising:
(a) a transmission line having a first and a second conductor which have inductance therealong and capacitance therebetween, said first conductor provided with signal output means at a plurality of points therealong;
(b) a plurality of diodes, each having a first and a second terminal, each connected by said first terminal to said first conductor at a respective one of said plurality of points; means for connecting all of said second terminals to a bias voltage source in forward bias relationship to said plurality by means of a common point;
(c) signal input means located at one end of said transmission line for receiving input signals greater in magnitude than said voltage source and in reverse bias relationship to said diodes;
(d) a short circuit termination means at the other end of said transmission line for reflecting and inverting said input signals; and
(e) resistance means having a first and a second end, said first end connected to said common point and said end adapted to receive said bias voltage.

References Cited

UNITED STATES PATENTS

| | | | |
|---|---|---|---|
| 2,617,873 | 11/1952 | Foot et al. | 328—119 |
| 2,701,305 | 2/1955 | Hopper | 328—119 |
| 2,795,775 | 6/1957 | De Faymoreau et al. | 328—65 |

FOREIGN PATENTS

| | | |
|---|---|---|
| 493,928 | 8/1950 | Belgium. |

ARTHUR GAUSS, *Primary Examiner.*

ROBERT H. PLOTKIN, *Assistant Examiner.*

U.S. Cl. X.R.

307—208; 328—65